(12) United States Patent  
Zhang et al.

(10) Patent No.: US 11,400,617 B2  
(45) Date of Patent: Aug. 2, 2022

(54) STONE-PLASTIC FLOOR AND METHOD OF PREPARING THE SAME

(71) Applicant: JIANGSU BEIER DECORATION MATERIALS CO., LTD., Changzhou (CN)

(72) Inventors: Xiaoling Zhang, Changzhou (CN); Zhiyuan Xiao, Changzhou (CN)

(73) Assignee: JIANGSU BBL HOME TECHNOLOGY COMPANY LIMITED, Changzhou (CN)

( * ) Notice: Subject to any disclaimer, the term of this patent is extended or adjusted under 35 U.S.C. 154(b) by 415 days.

(21) Appl. No.: 16/427,823

(22) Filed: May 31, 2019

(65) Prior Publication Data

US 2019/0283272 A1    Sep. 19, 2019

Related U.S. Application Data

(63) Continuation-in-part of application No. PCT/CN2017/071946, filed on Jan. 20, 2017.

(30) Foreign Application Priority Data

Dec. 2, 2016   (CN) .......................... 201611099662.4

(51) Int. Cl.
*B32B 7/08* (2019.01)
*B28B 3/02* (2006.01)
(Continued)

(52) U.S. Cl.
CPC ................ *B28B 3/025* (2013.01); *B28B 3/20* (2013.01); *B28B 3/224* (2013.01); *B32B 27/06* (2013.01);
(Continued)

(58) Field of Classification Search
CPC .......... B28B 3/025; B28B 3/20; B28B 3/224; B29C 67/242; B32B 21/08; B32B 21/14;
(Continued)

(56) References Cited

U.S. PATENT DOCUMENTS

2015/0267025 A1* 9/2015 Fang ......................... B32B 3/06  
428/318.6  
2017/0183878 A1   6/2017 Zhang et al.

FOREIGN PATENT DOCUMENTS

| CN | 105133818   | 12/2015 |
| CN | 105587103 A | 5/2016  |
| CN | 105908946 A | 8/2016  |

OTHER PUBLICATIONS

English Translation of International Search Report dated Aug. 30, 2017 in PCT/CN2017/071946, filed Jan. 20, 2017.

(Continued)

*Primary Examiner* — Lawrence D Ferguson

(57) ABSTRACT

Disclosed are a stone-plastic floor and a method of preparing the same. The resin substrate of the stone-plastic floor of the present disclosure is prepared by using raw materials with specific components and amounts, without using any plasticizing agent, toughening agent and foaming agent and without environmental hidden dangers. The resulting stone-plastic floor has high strength, high hardness, excellent shrinkage performance and no environmental hidden dangers, and can tolerate direct sunshine, and has good stability and long service life for use safety. The method of preparing the stone-plastic floor of the present disclosure has simple processes, enabling online continuous production with high production efficiency.

19 Claims, 2 Drawing Sheets

(51) Int. Cl.
*B28B 3/22* (2006.01)
*E04F 15/02* (2006.01)
*B32B 38/00* (2006.01)
*B28B 3/20* (2006.01)
*C04B 26/04* (2006.01)
*B32B 37/14* (2006.01)
*B32B 27/06* (2006.01)
*C04B 26/16* (2006.01)
*B32B 27/08* (2006.01)
*B32B 27/18* (2006.01)
*B32B 27/30* (2006.01)
*B32B 37/06* (2006.01)
*B32B 37/10* (2006.01)

(52) U.S. Cl.
CPC .......... *B32B 37/144* (2013.01); *B32B 38/004* (2013.01); *B32B 38/0012* (2013.01); *C04B 26/045* (2013.01); *C04B 26/16* (2013.01); *E04F 15/02* (2013.01); *B32B 7/08* (2013.01); *B32B 27/08* (2013.01); *B32B 27/18* (2013.01); *B32B 27/304* (2013.01); *B32B 37/06* (2013.01); *B32B 37/10* (2013.01); *B32B 2307/306* (2013.01); *B32B 2307/536* (2013.01); *B32B 2307/548* (2013.01); *B32B 2419/04* (2013.01)

(58) Field of Classification Search
CPC .......... B32B 2250/04; B32B 2264/104; B32B 2266/025; B32B 2270/00; B32B 2307/304; B32B 2307/306; B32B 2307/3065; B32B 2307/402; B32B 2307/536; B32B 2307/548; B32B 2307/554; B32B 2307/712; B32B 2307/732; B32B 2307/736; B32B 2419/00; B32B 2419/04; B32B 27/06; B32B 27/065; B32B 27/08; B32B 27/18; B32B 27/20; B32B 27/304; B32B 27/306; B32B 27/32; B32B 27/40; B32B 37/06; B32B 37/10; B32B 37/144; B32B 38/0012; B32B 38/004; B32B 5/18; B32B 7/08; C04B 26/045; C04B 26/16; E04F 15/02; E04F 15/105; E04F 2290/043
See application file for complete search history.

(56) References Cited

OTHER PUBLICATIONS

Written Opinion dated Aug. 30, 2017 in PCT/CN2017/071946, filed Jan. 20, 2017 (with English Translation).
Chinese Office Action dated Jul. 1, 2019 in Chinese Patent Application No. 201611099662.4 (submitting English translation only), 2 pages.
Chinese Office Action dated Dec. 26, 2018 in Chinese Patent Application No. 201611099662.4 (submitting English translation only), 10 pages.
Chinese Office Action dated Mar. 5, 2019 in Chinese Patent Application No. 201611099662.4 (submitting English translation only), 4 pages.

* cited by examiner

STONE-PLASTIC FLOOR AND METHOD OF PREPARING THE SAME

The present application is a continuation-in-part of the international application for application No. PCT/CN2017/071946 entitled "Stone-plastic floor and method of preparing the same" filed on Jan. 20, 2017.

TECHNICAL FIELD

The present disclosure relates to the technical field of building materials, and specifically to a stone-plastic floor and a method of preparing the same.

BACKGROUND ART

Also known as a stone-plastic floor tile, a stone-plastic floor has a standard name "a resin sheet floor", which is a high quality new ground decoration material developed by high-tech researches, with a solid base layer of high density and of high-fiber network structure formed by natural marble powder, and a wear-resisting layer of super-wear-resisting polymer resin coated on a surface, where it is processed through hundreds of processes. The product is realistic and beautiful in texture and is super wear-resisting, and has a bright and nonskid surface, and is a model of high-tech new material in the 21st century.

However, the existing stone-plastic floor has the following drawbacks:

first, containing plasticizing agent, having environmental hidden danger, with low hardness and large expansion and contraction coefficient;

second, having poor shrinkage performance, easy to break;

third, containing foaming agent, unable to tolerate high temperature, with low hardness and poor stability, being softened under high temperature conditions, and unable to be paved at a place under direct sunshine or on the subterranean heating with high temperature;

fourth, having short service life; and fifth, having complex production process, which requires stagewise processing, unable to achieve continuous production, and having low production efficiency.

DISCLOSURE

The present disclosure provides a method of preparing the described stone-plastic floor, where the following technical solutions may be adopted:

a stone-plastic floor comprising a resin substrate prepared mainly by the following components in parts by mass:

20-50 parts of resin, 50-80 parts of calcium carbonate, and 4-5.6 parts of auxiliary agent; and a method for preparing the abovementioned stone-plastic floor, comprising heating, stirring and mixing raw materials uniformly in proportion, and then delivering resulting mixed materials to a mold for plastic molding and thermal insulation, attaching a resulting profile after mold release with a surface layer and then performing thermal calendering attachment to obtain the stone-plastic floor after cooling molding.

DESCRIPTION OF THE DRAWINGS

Drawings required for use in the description of embodiments or the prior art will be introduced briefly below in order to explain the technical solutions of the embodiments of the present disclosure or of the prior art more clearly, and it will be apparent that the drawings described below are merely illustrative of some embodiments of the present disclosure, and those skilled in the art can also obtain, from these drawings, other drawings without inventive efforts.

List of Reference of Signs:

1- resin substrate;   2- color film;   3- wear-resisting layer;
4- bottom film.

DETAILED DESCRIPTION OF THE EMBODIMENTS

The technical solutions of the present disclosure will be described clearly and completely with reference to the drawings and the embodiments of the present disclosure. However, those skilled in the art would appreciate that the following examples described are some, but not all examples of the present disclosure, and are only for illustrating the disclosure, and shall not be construed as limiting the scope of the present disclosure. All the other embodiments, obtained by those skilled in the art in light of the embodiments of the present disclosure without inventive efforts, will fall within the scope of the present disclosure as claimed. If no specific conditions are specified in the example, the general conditions or the conditions recommended by the manufacturer shall apply. If not indicated by the manufacturer, the reagents or instruments used are commercially available conventional products.

In the description of the present disclosure, it should be indicated that orientation or positional relations indicated by terms such as "center", "up", "down", "left", "right", "vertical", "horizontal", "inside", and "outside" are based on the orientation or positional relations as shown in the figures, only for facilitating description of the present disclosure and simplifying the description, rather than indicating or implying that the referred devices or elements must be in a particular orientation or constructed or operated in the particular orientation, and therefore they should not be construed as limiting the present disclosure.

In the description of the present disclosure, it should be indicated that unless otherwise expressly specified or defined, terms "mount", "couple", and "connect" should be understood broadly, and for example, a connection may be a fixed connection, or a detachable connection, or an integrated connection; may be a mechanical connection or an electric connection; or may be a direct connection, or an indirect connection via an intermediate medium, or may be an internal communication between two elements. The specific meanings of the above-described terms in the present disclosure could be understood by those skilled in the art according to specific situations.

An object of the present disclosure comprises providing a stone-plastic floor, the stone-plastic floor uses no plasticizing agent, toughening agent and foaming agent, has high strength, high hardness, excellent shrinkage performance and no environmental hidden dangers, and can tolerate direct sunshine, has good stability and long service life in use safety. An object of the present disclosure further comprises providing a method of preparing the stone-plastic floor, which method has processes, enabling online continuous production and high production efficiency.

Figure 1:
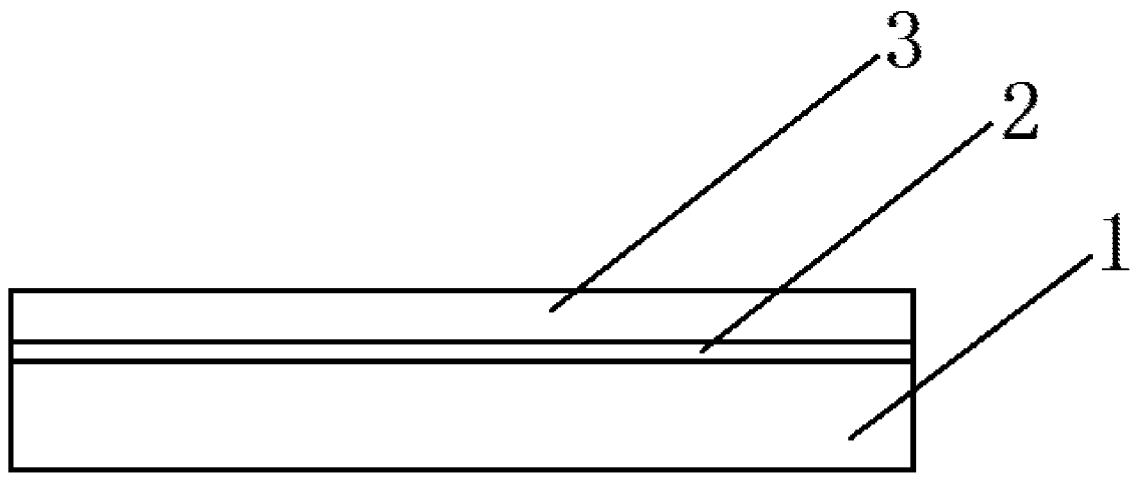
FIG. 1 is a schematic structural view of a stone-plastic floor provided by a specific embodiment of the present disclosure.
Figure 2:
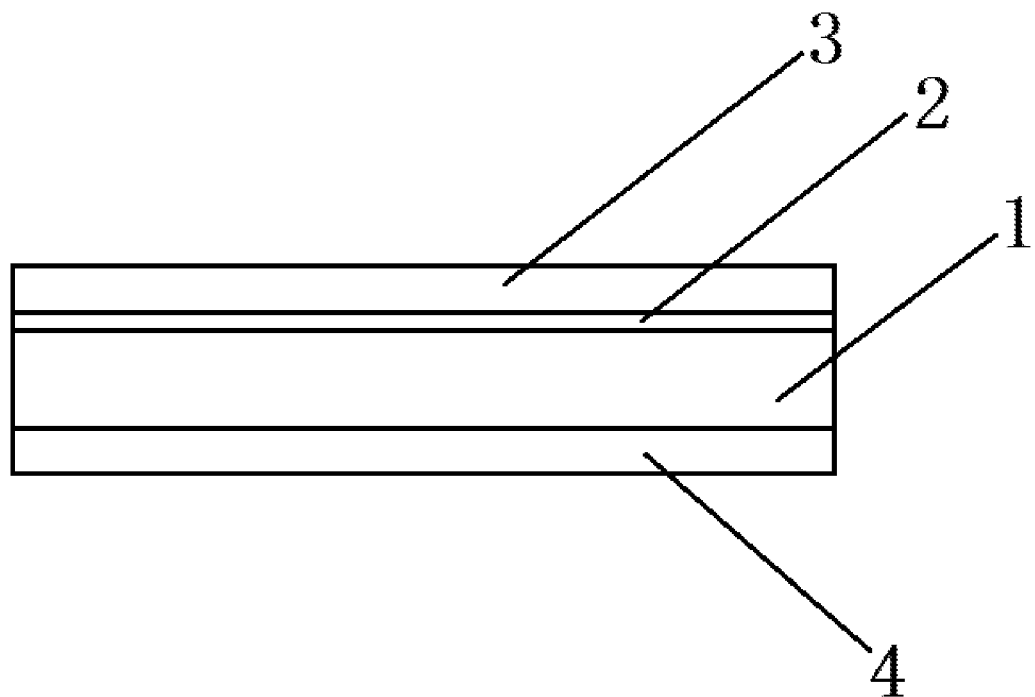
FIG. 2 is a schematic structural view of a stone-plastic floor provided by another specific embodiment of the present disclosure.

FIG. 1 is a schematic structural view of a stone-plastic floor provided by a specific embodiment of the present disclosure; FIG. 2 is a schematic structural view of a stone-plastic floor provided by another specific embodiment of the present disclosure; and FIG. 3 is a schematic structural view of a stone-plastic floor prepared by a specific embodiment of the present disclosure which adopts co-extrusion die.

Figure 3:
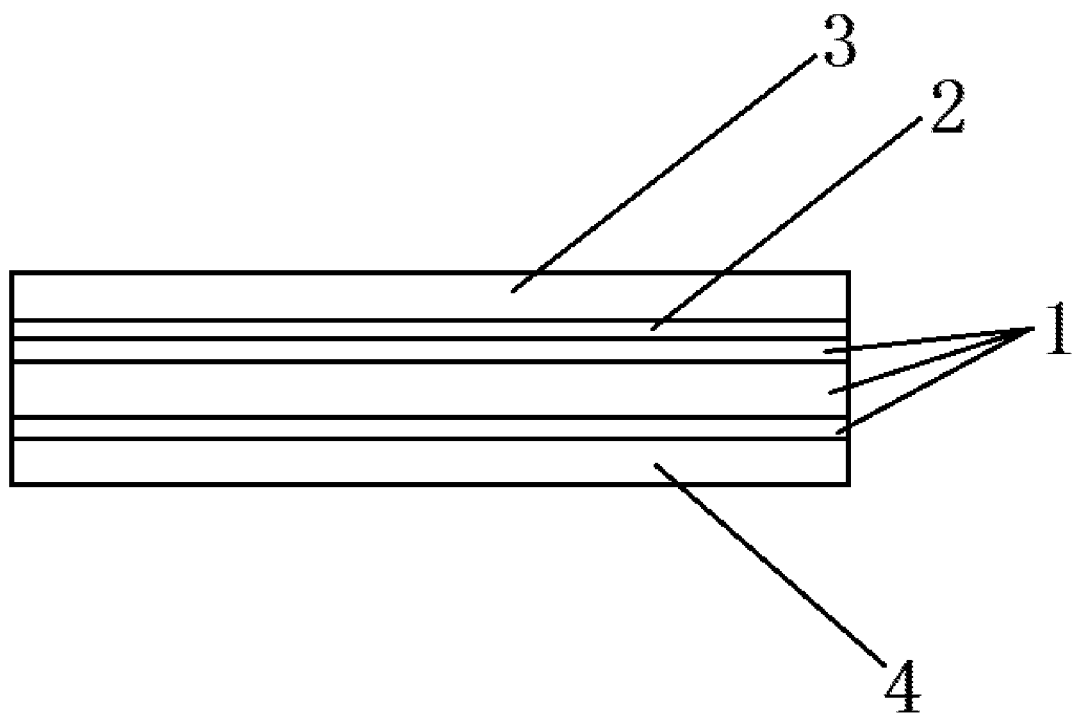
FIG. 3 is a schematic structural view of a stone-plastic floor prepared by a specific embodiment of the present disclosure which adopts co-extrusion die.

As shown in FIGS. 1-3, the present disclosure provides a stone-plastic floor comprising a resin substrate 1, an upper surface of the resin substrate 1 is provided with a surface layer, and the resin substrate 1 is prepared mainly by the following components in parts by mass:

20-50 parts of resin, 50-80 parts of calcium carbonate, and 4-5.6 parts of auxiliary agent;

preferably, the resin substrate 1 is prepared mainly by the following components in parts by mass:

20-50 parts of a resin, 50-80 parts of calcium carbonate, and 4-5.6 parts of an auxiliary agent; and further preferably, the resin substrate 1 is prepared mainly by the following components in parts by mass:

30 parts of resin, 80 parts of calcium carbonate, and 4.2 parts of auxiliary agents.

The resin substrate 1 of the stone-plastic floor of the present disclosure is prepared by using raw materials with specific components and amounts, without using any plasticizing agent, toughening agent and foaming agent and without environmental hidden dangers, and the resulting stone-plastic floor has high strength, high hardness, excellent shrinkage performance and no environmental hidden dangers, and can tolerate direct sunshine, and has good stability and long service life for use safety.

Preferably, the resin comprises one or more of PP resin, TPU resin, and PVC resin, and preferably comprises PP resin, TPU resin, or PVC resin, and further preferably comprises PVC resin.

Preferably, the resin substrate 1 has a thickness of 1-10 mm, preferably 3-7 mm, further preferably of 5 mm.

Further preferably, the resin substrate comprises a plurality of layers each having a thickness of 1-2 mm.

The present disclosure prepares a resin substrate 1 having a specific thickness by a raw material with specific components and amounts, which helps further improve the hardness and the shrinkage performance of the resulting stone-plastic floor.

Preferably, the surface layer comprises a color film 2 and a wear-resisting layer 3, wherein the color film 2 is provided on an upper surface of the resin substrate 1, and the wear-resisting layer 3 is provided on an upper surface of the color film 2.

Further preferably, the upper surface of the color film 3 is provided with a UV lacquer and a wear-resisting layer sequentially from bottom to top.

The color film 3 of the present disclosure may employ a commercially available conventional color film, and a UV lacquer may be provided on the color film for binding and fixing the color film 2 and the wear-resisting layer 3 as needed.

Preferably, the surface layer may further be provided thereon with an LVT layer, a fire-resistant layer or a veneer layer, etc., and the stone-plastic floor of the present disclosure may be modified as needed.

Preferably, the color film 2 has a thickness of 0.06-0.08 mm, preferably 0.06-0.07 mm, and further preferably of 0.07 mm.

Preferably, the wear-resisting layer 3 has a thickness of 0.07-1 mm, preferably 0.2-0.4 mm, and further preferably of 0.3 mm.

The present disclosure employs the color film 2 and the wear-resisting layer 3 having a specific thickness, which help maintain the high strength of the resulting stone-plastic floor while reducing its effect on the shrinkage performance of the stone-plastic floor.

Preferably, a lower surface of the resin substrate 1 is provided with a bottom film 4.

Preferably, the bottom film 4 has a thickness of 0.1-1.0 mm, preferably 0.3-0.8 mm, further preferably of 0.5 mm.

The present disclosure employs a bottom film 4 having a specific thickness, which helps maintain the high strength of the resulting stone-plastic floor while reducing its effect on the shrinkage performance of the stone-plastic floor.

The bottom film 4 may be provided thereunder with a muting layer as needed, and the muting layer may employ a commercially available conventional muting layer material for floor, including but not limited to one or more of CORK, EVA, and IXPE.

The color film 2, the wear-resisting layer 3 and the bottom film 4 all may employ a commercially available conventional color film 2, wear-resisting layer 3 and bottom film 4 of materials for resin stone-plastic floor.

The color film 2, the wear-resisting layer 3, and the bottom film 4 described in the present disclosure may be used in one or more layers.

Preferably, the auxiliary agent comprises one or more of a stabilizing agent, a modifying agent, and a coloring agent.

Preferably, the stabilizing agent is used in an amount of 1.5-2 parts, preferably 1.5-1.8 parts, further preferably of 1.5 parts.

Preferably, the modifying agent is used in an amount of 1.5-2 parts, preferably 1.5-1.8 parts, further preferably of 1.5 parts.

Preferably, the lubricating agent is used in an amount of 0.5-0.8 parts, preferably 0.5-0.6 parts, further preferably of 0.5 parts.

Preferably, the coloring agent is used in an amount of 0.5-0.8 parts, preferably 0.6-0.8 parts, further preferably of 0.7 parts.

The stabilizing agent, the modifying agent, the lubricating agent, and the coloring agent may employ the commercially available conventional stabilizing agent, modifying agent, lubricating agent, and coloring agent for resin, or may employ a composite auxiliary agent.

The present disclosure employs an auxiliary agent with specific components and amounts, which facilitates improving the properties of the resulting resin substrate 1 and further improves the overall performance of the resulting stone-plastic floor.

Preferably, the calcium carbonate powder may be heavy calcium carbonate powder or light calcium carbonate powder, preferably being light calcium carbonate.

A method for preparing the abovementioned stone-plastic floor, comprising heating, stirring and mixing raw materials uniformly in proportion, and then delivering resulting mixed materials to a mold for plastic molding and thermal insulation, attaching a resulting profile after mold release with a surface layer and then performing thermal calendering attachment to obtain the stone-plastic floor after cooling molding.

The method of preparing the stone-plastic floor of the present disclosure has simple processes, enabling online continuous production with high production efficiency.

Preferably, the resulting profile after mold release is attached with a surface layer and a bottom film 4, and then subjected to a thermal calendering attachment.

Further preferably, after mold release, the resulting profile is attached with a color film 2, a wear-resisting layer 3 and a bottom film 4 sequentially, and then subjected to a thermal calendering attachment.

With the present disclosure, the resulting high-temperature profile obtained after mold release may be directly attached the color film 2, the wear-resisting layer 3 and the bottom film 4, and subjected to a thermal calendering attachment, there is no need of a conventional process for cooling the resin substrate 1 for formation, and also there is no need of glue for attaching various layers, thus avoiding tedious processes for producing the stone-plastic floor in segments required in the prior art, and greatly improving the production efficiency.

Preferably, the resulting mixed material is extruded by a twin-screw extruder into a mold for plastic molding and thermal insulation.

Alternatively, the present disclosure may extrude the resulting mixed material by a conventional twin-screw extruder into a mold for plastic molding and thermal insulation, including but not limited to an 80 twin-screw extruder, a 92 twin-screw extruder, an 110 twin-screw extruder and an 132 twin-screw extruder.

The use of the twin-screw extruder of the present disclosure can fully ensure the uniformity of the extruded material, and further improve the overall performance of the resulting stone-plastic floor.

Preferably, extrusion temperature is 165-180° C., preferably 165-175° C., further preferably 165-170° C.

The use of a specific extrusion temperature of the present disclosure can fully ensure the flowability and plasticity of the material, which helps improve the uniformity and stability of the extruded material, and further improve the overall performance of the resulting stone-plastic floor.

Preferably, mold temperature is 185-205° C., preferably 190-200° C. and further preferably 195-200° C.

Without the use of a plasticizing agent, the mold of the present disclosure maintains a specific temperature, which helps maintain the plasticity of the materials therein, helps attach closely to other layers of materials, and facilitates formation, enabling continuous operation and greatly improving productivity.

More preferably, the extrusion is carried out by a co-extrusion die.

A multi-layer basic product can be obtained by extruding with a co-extrusion die. As shown in FIG. 3, a resin substrate 1 in a structure of multiple layers connected can be prepared by a co-extrusion die combined with a thermal calendering operation, where the used resin substrate may have the same or different components, which can greatly enrich the functionality of the resulting stone-plastic floor, making it possible to have a variety of stone-plastic floor with different properties.

Preferably, the resulting profile after mold release is attached directly with a surface layer, and then subjected to a thermal calendering attachment by a four-roll calender or an oil hydraulic press.

The present disclosure performs thermal calendering attachment on the well-attached profile by a four-roll calender or an oil hydraulic press, requiring no multiple forming processes, and requiring no glue to attach various layers.

Further preferably, a temperature of the thermal calendering attachment is 125-160° C., preferably 140-160° C. and further preferably 155-165° C.

Further preferably, a pressure of the thermal calendering attachment is 6-18 MPa, preferably 12-18 MPa, and further preferably 18 MPa.

Further preferably, the time for the thermal calendering attachment is 30-90 min, preferably 60-90 min, further preferably 90 min.

With specific working parameters employed, the present disclosure helps promote tight binding among various layers, fully increases the binding strength among various layers of the resulting stone-plastic floor, and prolongs the service life.

Preferably, a mixing temperature for heating, stirring and mixing the raw materials uniformly in proportion as described is 120-140° C., preferably 125-135° C. and further preferably 125-130° C.

The present disclosure heats, stirs and mixes the raw materials at a specific temperature, enabling to ensure proper flowability and plasticity of the resulting materials, helping to promote uniform and full mixing of the raw materials, and further improving the overall performance of the resulting stone-plastic floor.

Preferably, a stirring rate for heating and stirring the raw materials uniformly in proportion as described is 1500-2500 rpm, preferably 1500-2000 rpm, and further preferably 1500-1800 rpm.

Preferably, a stirring time for heating, stirring and mixing the raw materials uniformly in proportion as described is 10-20 min, preferably 15-20 min, further preferably 20 min.

The present disclosure heats and stirs the raw materials for a specific period of time at a specific stirring rate, helping to promote uniform and full mixing of the raw materials, and further improving the overall performance of the resulting stone-plastic floor.

The method for preparing the stone-plastic floor of the present disclosure can implement online continuous production by means of the existing automatic means, specifically including:

raw materials are mixed in proportion; after the mixing of raw material is completed, the mixed material may be fed automatically by a vacuum feeding machine, sucked into a high-speed mixer, and thermally mixed under a specific condition to complete the full mixing of the raw materials; the thermally mixed materials may be automatically delivered to a material storage tank, the material storage tank is mainly used for material storage, and the material storage tank is delivered to an extruder through a transportation pipeline, wherein the material for the extruder may be supplied to the extruder at a fixed time and quantity, the extruder is connected to a mold, the mold maintains a specific temperature, the material initially formed in the mold is directly attached with a color film 2, a wear-resisting layer 3 and a bottom layer, etc., and then subjected to a thermal calendering attachment by a four-roll calender, and formed by cooling, obtaining a stone-plastic floor.

EXAMPLES 1-10

The stone-plastic floor in Examples 1-10 is prepared by the following preparation method, specifically comprising the following steps:

(1) preparing raw materials for preparing a resin substrate in proportion;

(2) mixing the raw materials, and automatically feeding the resulting materials by a vacuum feeding machine after the completion of mixing, followed by sucking into a high-speed mixer for thermal mixing;

(3) automatically delivering the thermally heated materials to a material storage tank, where the material storage tank is connected to an 80 twin-screw extruder for extrusion;

(4) extruding, by an extruder, the material into a mold, with the material initially formed;

(5) directly attaching the initially formed material with a color film, a wear-resisting layer and a bottom layer, etc., and performing a thermal calendering attachment by a four-roll calender; and (6) molding by naturally cooling a profile subjected to the thermal calendering attachment to obtain a stone-plastic floor.

The information about the raw materials used by various examples in the disclosure is as follows:

the coloring agent was the ZQ series of fluorescent pigments, manufactured by Xingye New Materials Co., Ltd. Shenzhen, China, wherein Examples 1-4 employed orange yellow coloring agent and Examples 5-10 employed white coloring agent;

the color film was manufactured by Longquan Printing and Dyeing Co., Ltd. Wuxi, China, with components containing pearl powder;

the wear-resisting layer employed aluminum oxide, manufactured by Tonggao Chemical Co., Ltd. Jingjiang, China;

bottom film employed barite powder, manufactured by Hengda Chemical Co., Ltd. Yichang, China, where Examples 1-2 do not use bottom film;

Example 6 and Example 10 were prepared using a co-extrusion die; and the amount and the preparation condition of each raw material used in each example are shown in Table 1:

TABLE 1

The amount and the preparation condition of each raw material used in each example

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Resin powder/part | 20 | 50 | 20 | 40 | 25 | 35 | 30 | 35 | 30 | 30 |
| Calcium carbonate powder/part | 50 | 80 | 70 | 80 | 74 | 78 | 80 | 75 | 80 | 80 |
| Stabilizing agent/part | 1.5 | 2 | 1.5 | 1.8 | 1.7 | 1.6 | 1.5 | 1.65 | 1.5 | 1.5 |
| Modifying agent/part | 1.5 | 2 | 1.5 | 1.8 | 1.7 | 1.6 | 1.5 | 1.65 | 1.5 | 1.5 |
| lubricating agent/part | 0.5 | 0.8 | 0.5 | 0.6 | 0.6 | 0.5 | 0.5 | 0.55 | 0.5 | 0.5 |
| Coloring agent/part | 0 | 0 | 0.5 | 0.8 | 0.6 | 0.8 | 0.7 | 0.7 | 0.7 | 0.7 |
| Thermal mixing Temperature/°C. | 120-122 | 138-140 | 125-127 | 133-135 | 125-127 | 128-130 | 128-130 | 129-131 | 128-130 | 126-128 |
| Stirring rate for thermal mixing (rpm) | 1500 | 2500 | 1500 | 2000 | 1500 | 1800 | 1600 | 1750 | 1700 | 1800 |
| stirring time for thermal mixing/min | 10 | 20 | 15 | 20 | 17 | 18 | 20 | 17 | 20 | 20 |
| Extrusion temperature/°C. | 165-167 | 178-180 | 165-167 | 173-175 | 165-167 | 168-170 | 168-170 | 165-167 | 166-168 | 167-169 |
| Mold temperature/°C. | 185-187 | 203-205 | 190-192 | 198-200 | 195-197 | 198-200 | 198-200 | 195-197 | 196-198 | 197-199 |
| Temperature for thermal calendering/°C. | 125-127 | 158-160 | 140-142 | 158-160 | 155-157 | 160-163 | 163-165 | 155-157 | 159-161 | 162-163 |
| Pressure for thermal calendering/Mpa | 6 | 18 | 12 | 18 | 14 | 16 | 18 | 15 | 18 | 18 |
| Time for thermal calendering/min | 30 | 90 | 60 | 90 | 70 | 80 | 90 | 75 | 90 | 90 |

Examples 1-2 employed PP resin powder of model JM-391 manufactured by Lotte Chemical of Korea; Examples 3-4 employed TPU resin powder of model 688A50N manufactured by BASF of Germany; and Examples 5-10 employed PVC resin powder of model LK170 manufactured by LG Chem;

Examples 1-4 employed heavy calcium carbonate powder manufactured by Hengda Chemical Co., Ltd. Yichang, China; and Examples 5-10 employed light calcium carbonate powder manufactured by Shengcheng Mineral Processing Factory, lingshou County, China;

the stabilizing agent employed liquid strontium zinc stabilizing agent manufactured by Xindi Plastic Material Co., Ltd. Xiamen, China;

the modifying agent employed a heat-resistant modifying agent manufactured by Zirun Chemical Auxiliary Agent Co., Ltd. Shanghai, China;

the lubricating agent was of the model 316A, manufactured by Zhongcheng Environmental Protection Technology Co., Ltd. Jiaxing, China;

COMPARATIVE EXAMPLES 1-12

Comparative Example 1 is a commercially available ordinary LVT floor (manufactured by Hanhua Building Materials Technology Co., Ltd. Anhui, China), Comparative Example 2 is a commercially available ordinary resin foamed floor (manufactured by Tengfang Decoration Materials Co., Ltd. Wuxi, China), and floors in Comparative Examples 3-12 are prepared by the following preparation method, specifically including the following steps:

(1) preparing a raw material for preparing a resin substrate in proportion;

(2) mixing various raw materials, wherein, after the mixing of the raw material is completed, the mixed material is automatically fed by a vacuum feeder, and sucked into a high-speed mixer for thermal mixing;

(3) delivering automatically the thermally mixed materials to a material storage tank, where the material storage tank is connected to an 80 twin-screw extruder for extrusion;

(4) extruding, by an extruder, the material into the mold, with the material initially formed;

(5) directly attaching the initially formed material with a color film, a wear-resisting layer and a bottom layer, etc., and performing a thermal calendering attachment by a four-roll calender; and (6) forming by cooling a profile subjected to the thermal calendering attachment naturally to obtain a stone-plastic floor.

The information about the raw materials used by various Comparative Examples is as follows:

Comparative Example 6 employed PP resin powder of model JM-390 manufactured by Lotte Chemical of Korea; Comparative Examples 3, 5, 7 and 8 employed TPU resin powder manufactured by BASF of Germany; and Comparative Examples 4 and 9-12 employed PVC resin powder of model LK170 manufactured by LG Chem;

Comparative Examples 3 and 5-8 employed heavy calcium carbonate powder manufactured by Hengda Chemical Co., Ltd. Yichang, China; and Comparative Examples 4 and 9-12 employed light calcium carbonate powder manufactured by Shengcheng Mineral Processing Factory, Lingshou County, China;

Comparative Example 3 employed ACR toughening agent of model ACR-201, manufactured by Kanggaote Plastic Technology Co., Ltd. Jingjiang, China;

Comparative Example 4 employed DOP plasticizing agent, manufactured by Shuanghong Chemical Technology Co., Ltd. Yancheng, China;

Comparative Example 5 employed AC foaming agent of model SA1000, manufactured by Yutai Rubber & Plastic Technology Co., Ltd. Zhejiang, China;

the stabilizing agent employed liquid strontium zinc stabilizing agent manufactured by Xindi Plastic Material Co., Ltd. Xiamen, China;

the modifying agent employed heat-resistant modifying agent manufactured by Zirun Chemical Auxiliary Agent Co., Ltd., Shanghai, China;

the lubricating agent was of the model 316A, manufactured by Zhongcheng Environmental Protection Technology Co., Ltd. Jiaxing, China;

the coloring agent was the ZQ series of fluorescent pigments, manufactured by Xingye New Materials Co., Ltd., Shenzhen, China, where Comparative Examples 3 and 5-8 employed orange yellow and Comparative Examples 4 and 9-12 employed white;

the color film was manufactured by Longquan Printing and Dyeing Co., Ltd., Wuxi, China, with components containing pearl powder;

the wear-resisting layer employed aluminum oxide, manufactured by Tonggao Chemical Co., Ltd. Jingjiang, China;

the bottom film employed barite powder, manufactured by Hengda Chemical Co., Ltd., Yichang, China, where Comparative Example 6 did not use a bottom film; and Comparative Example 10 was prepared using a co-extrusion die.

The amount (in parts by mass) and the preparation condition of each raw material used in each Comparative Example are shown in Table 2:

TABLE 2

The amount and the preparation condition of each raw material used in each Comparative Example

| | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|
| Resin powder/part | 40 | 25 | 40 | 50 | 20 | 40 | 25 | 35 | 30 | 35 |
| Calcium carbonate powder/part | 80 | 74 | 80 | 80 | 44 | 80 | 74 | 78 | 80 | 75 |
| Stabilizing agent/part | 1.8 | 1.7 | 1.8 | 2 | 1.5 | 1 | 1.7 | 1.6 | 1.5 | 1.65 |
| Modifying agent/part | 0 | 0 | 0 | 2 | 1.5 | 1.8 | 1.7 | 1 | 1.5 | 1.65 |
| Lubricating agent/part | 0.6 | 0.6 | 0.6 | 0.8 | 0.5 | 0.6 | 0.2 | 0.5 | 0.5 | 0.55 |
| Coloring agent/part | 0.8 | 0.6 | 0.8 | 0 | 0.5 | 0.8 | 0.6 | 0.8 | 0.7 | 0.7 |
| Thermal mixing temperature/□ C. | 133-135 | 125-127 | 133-135 | 138-140 | 125-127 | 133-135 | 125-127 | 128-130 | 128-130 | 129-131 |
| Stirring rate for thermal mixing (rpm) | 2000 | 1500 | 2000 | 2500 | 1500 | 2000 | 1500 | 1800 | 1600 | 1750 |
| Stirring time for thermal mixing/min | 20 | 17 | 20 | 20 | 15 | 20 | 17 | 18 | 20 | 17 |
| Extrusion temperature/□ C. | 173-175 | 165-167 | 173-175 | 178-180 | 165-167 | 173-175 | 165-167 | 168-170 | 185-187 | 165-167 |
| Mold temperature/□ C. | 198-200 | 195-197 | 198-200 | 203-205 | 190-192 | 198-200 | 195-197 | 198-200 | 198-200 | 210-212 |
| Temperature for thermal calendering/□ C. | 158-160 | 155-157 | 158-160 | 158-160 | 140-142 | 158-160 | 155-157 | 160-163 | 163-165 | 155-157 |
| Pressure for thermal calendering/Mpa | 18 | 14 | 18 | 18 | 12 | 18 | 14 | 16 | 18 | 15 |
| Time for thermal calendering/min | 90 | 70 | 90 | 90 | 60 | 90 | 70 | 80 | 90 | 75 |
| Toughening agent/part | 1.8 | 0 | 0 | 0 | 0 | 0 | 0 | 0 | 0 | 0 |
| Plasticizing agent/part | 0 | 1.7 | 0 | 0 | 0 | 0 | 0 | 0 | 0 | 0 |
| Foaming agent/part | 0 | 0 | 1.8 | 0 | 0 | 0 | 0 | 0 | 0 | 0 |

The lateral shrinkage, the longitudinal shrinkage, and the hardness at a normal temperature of 23□ C and a high temperature of 80□ C of the floor prepared by each example of the present disclosure and Comparative Examples were tested, and the test results are shown in Tables 3 and 4.

TABLE 3

The test results of the stone-plastic floor of the present disclosure

| Example | Resin substrate thickness/mm | Color film thickness/mm | Wear-resisting layer thickness/mm | Bottom film thickness/mm | Lateral shrinkage/% | Longitudinal shrinkage/% | Hardness (Shore D hardness tester) |
|---|---|---|---|---|---|---|---|
| Example 1 | 1 | 0.06 | 0.1 | 0 | 0.03 | 0.03 | 75° at a normal temperature of 23□ C., 68° at a high temperature of 80□ C. |
| Example 2 | 10 | 0.08 | 0.5 | 0 | 0.03 | 0.03 | 76° at a normal temperature of 23□ C., 68° at a high temperature of 80□ C. |
| Example 3 | 3 | 0.06 | 0.2 | 0.1 | 0.02 | 0.03 | 76° at a normal temperature of 23□ C., 69° at a high temperature of 80□ C. |
| Example 4 | 7 | 0.07 | 0.4 | 1.0 | 0.02 | 0.03 | 76° at a normal temperature of 23□ C., 69° at a high temperature of 80□ C. |
| Example 5 | 4 | 0.06 | 0.3 | 0.3 | 0.02 | 0.02 | 77° at a normal temperature of 23□ C., 69° at a high temperature of 80□ C. |
| Example 6 | 6 | 0.07 | 0.4 | 0.8 | 0.01 | 0.02 | 77° at a normal temperature of 23□ C., 70° at a high temperature of 80□ C. |
| Example 7 | 5 | 0.07 | 0.3 | 0.5 | 0.01 | 0.01 | 78° at a normal temperature of 23□ C., 70° at a high temperature of 80□ C. |
| Example 8 | 4 | 0.06 | 0.3 | 0.3 | 0.02 | 0.02 | 78° at a normal temperature of 23□ C., 69° at a high temperature of 80□ C. |
| Example 9 | 5 | 0.07 | 0.3 | 0.5 | 0.01 | 0.01 | 79° at a normal temperature of 23□ C., 71° at a high temperature of 80□ C. |
| Example 10 | 6 | 0.07 | 0.3 | 0.5 | 0.01 | 0.01 | 81° at a normal temperature of 23□ C., 72° at a high temperature of 80□ C. |
| EN649 standard | — | — | — | — | ≤0.25 | ≤0.25 | — |

* Three-layer substrates in Examples 6 and 10 were prepared by a co-extrusion die, each layer having a thickness of 2 mm.

TABLE 4

The test results of the floors of the Comparative Examples

| Comparative Example | Resin substrate thickness/mm | Color film thickness/mm | Wear-resisting layer thickness/mm | Bottom film thickness/mm | Lateral shrinkage/% | Lngitudinal shrinkage/% | Hardness (Shore D hardness tester) |
|---|---|---|---|---|---|---|---|
| Comparative Example 1 | — | — | — | — | 0.08-0.12 | 0.12-0.18 | 58-62° at a normal temperature of 23□ C., 36-40° at a high temperature of 80□ C. |
| Comparative Example 2 | — | — | — | — | 0.08-0.12 | 0.12-0.18 | 58-62° at a normal temperature of 23□ C., 36-40° at a high temperature of 80□ C. |
| Comparative Example 3 | 7 | 0.07 | 0.4 | 1.0 | 0.07 | 0.06 | 70° at a normal temperature of 23□ C., 61° at a high temperature of 80□ C. |

TABLE 4-continued

The test results of the floors of the Comparative Examples

| Comparative Example | Resin substrate thickness/mm | Color film thickness/mm | Wear-resisting layer thickness/mm | Bottom film thickness/mm | Lateral shrinkage/% | Lngitudinal shrinkage/% | Hardness (Shore D hardness tester) |
|---|---|---|---|---|---|---|---|
| Comparative Example 4 | 4 | 0.06 | 0.3 | 0.3 | 0.13 | 0.18 | 60° at a normal temperature of 23☐ C., 39° at a high temperature of 80☐ C. |
| Comparative Example 5 | 7 | 0.07 | 0.4 | 1.0 | 0.16 | 0.43 | 49° at a normal temperature of 23☐ C., 36° at a high temperature of 80☐ C. |
| Comparative Example 6 | 10 | 0.08 | 0.5 | 0 | 0.05 | 0.06 | 72° at a normal temperature of 23☐ C., 65° at a high temperature of 80☐ C. |
| Comparative Example 7 | 3 | 0.06 | 0.2 | 0.1 | 0.07 | 0.06 | 72° at a normal temperature of 23☐ C., 65° at a high temperature of 80☐ C. |
| Comparative Example 8 | 7 | 0.07 | 0.4 | 1.0 | 0.05 | 0.06 | 71° at a normal temperature of 23☐ C., 64° at a high temperature of 80☐ C. |
| Comparative Example 9 | 4 | 0.06 | 0.3 | 0.3 | 0.04 | 0.05 | 73° at a normal temperature of 23☐ C., 65° at a high temperature of 80☐ C. |
| Comparative Example 10 | 6 | 0.07 | 0.4 | 0.8 | 0.07 | 0.07 | 72° at a normal temperature of 23☐ C., 64° at a high temperature of 80☐ C. |
| Comparative Example 11 | 5 | 0.07 | 0.3 | 0.5 | 0.07 | 0.07 | 70° at a normal temperature of 23☐ C., 61° at a high temperature of 80☐ C. |
| Comparative Example 12 | 4 | 0.06 | 0.3 | 0.3 | 0.07 | 0.06 | 71° at a normal temperature of 23☐ C., 62° at a high temperature of 80☐ C. |
| EN649 standard | — | — | — | — | ≤0.25 | ≤0.25 | — |

\* Three-layer resin substrate in Example 10 was prepared by a co-extrusion die, each layer having a thickness of 2 mm.

In the tests, the commercially available ordinary LVT floor is a product of 4.2 mm, and the commercially available ordinary resin foamed plate is a product of 5.5 mm, and by contrast. The stone-plastic floor of the present disclosure has significantly improved shrinkage performance and hardness over the commercially available ordinary LVT floor and the commercially available ordinary resin foamed plate, and the stone-plastic floor of the present disclosure has good stability. Given the above excellent stability, the service life can be prolonged by 5-10 years compared with the commercially available ordinary LVT floor and the commercially available ordinary resin foamed plate.

A toughening agent was employed in Comparative Example 3. As shown in the test results in Tables 3 and 4, compared with the example of the present application which does not use the toughening agent, the floor prepared according to Comparative Example 3 has a poor stability, significantly higher lateral shrinkage and longitudinal shrinkage rate, and remarkable reduction in the hardness at normal and high temperatures.

A plasticizing agent was employed in Comparative Example 4. As shown by the test results in Tables 3 and 4, compared with the example of the present application which does not use the plasticizing agent, the floor prepared according to Comparative Example 4 has a poor stability, significantly higher lateral shrinkage and longitudinal shrinkage rate, and remarkable reduction in the hardness at normal and high temperatures. A foaming agent was employed in Comparative Example 5. As shown in the test results in Tables 3 and 4, compared with the example of the present application which does not use the plasticizing agent, the floor prepared according to Comparative Example 5 has a poor stability, significantly higher longitudinal shrinkage rate, and remarkable reduction in the hardness at normal and high temperatures.

Comparative Examples 6-12 employed specific raw materials of the stone-plastic floor of the present disclosure respectively, but with only the content of certain specific raw material or one preparation condition not falling within the preferable range of condition as described in the present disclosure. As shown in the test results in Tables 3 and 4, compared with the examples of the application, the floor prepared according to Comparative Examples 6-12 has a poor stability, significantly higher lateral shrinkage and longitudinal shrinkage rate, and remarkable reduction in the hardness at normal and high temperatures.

The resin substrate of the stone-plastic floor of the present disclosure was prepared by using raw materials with specific components and amounts, without utilization of any plasticizing agent, toughening agent and foaming agent and without environmental hidden dangers. The resulting stone-plastic floor has a high strength and high hardness, without any environmental hidden dangers, and can tolerate direct sunshine, and is significantly improved.

The method of preparing the stone-plastic floor of the present disclosure has simple processes, without requiring stagewise production, enabling online continuous production with high production efficiency, and allowing the control of the size of the stone-plastic floor by the mold. During the preparation process, the stone-plastic floor of the present disclosure does not use glue to bind various adjacent layers. In the case of different components used for the various layers in the examples of the present disclosure, it is usually necessary to use glue to bind various adjacent layers in the prior art, while the present disclosure adopts direct binding, which is more favorable to attaching various layers closely. However, due to the different components used in each layer, in the case of direct attachment, the performance of the resin substrate would be directly affected by the components and used amount thereof in the adjacent layers, whereas the present disclosure reduces such influence effectively and even improves the shrinkage performance and the hardness of the resulting stone-plastic floor. The stone-plastic floor of the present disclosure has a hardness at 80° C. which is even significantly higher than that of a commercially available ordinary LVT floor and a commercially available ordinary resin foaming plate at a normal temperature of 23° C., and thus the present disclosure has an unexpected technical effect, allowing the stone-plastic floor of the present disclosure to be more widely applied to various sites for paving.

The stone-plastic floor of the present disclosure does not contain any plasticizing agent or foaming agent, and has no environmental hidden danger at all. The stone-plastic floor of the present disclosure has excellent shrinkage performance and small shrinkage proportion, wherein the shrinkage rate of the stone-plastic floor of the present disclosure can be controlled within 0.03% or even within 0.01%. The stone-plastic floor of the present disclosure is high temperature resistant, in contrast to that the ordinary stone-plastic floors are usually softened under high temperature conditions and cannot be paved at a position under direct sunshine or on the subterranean heating with high temperature. The high-strength stone-plastic floor of the present disclosure completely overcomes such drawback, which maintains high strength at high temperature, and the hardness can reach up to 72° at a high temperature of 80° C., which is even higher than the hardness of the ordinary stone-plastic floor at a normal temperature condition, enabling the stone-plastic floor to tolerate extreme weather conditions (including direct sunshine). The stone-plastic floor of the present disclosure has a prolonged service life compared with the ordinary stone-plastic floor; and the stone-plastic floor of the present disclosure can be further attached with a surface layer of different components, and thus different advantages of other floors can be fully utilized simultaneously while the high hardness and the excellent shrinkage performance are obtained.

Although the present disclosure has been illustrated and described with specific examples, it should be understood that the above examples are only used to illustrate the technical solutions of the present disclosure, rather than limiting; those ordinary skilled in the art should understand that the technical solutions described in the above examples may be modified, or some or all of the technical features may be equivalently replaced, without departing away from the spirit and range of the present disclosure, and these modifications or replacements do not deviate the essence of the corresponding technical solutions from the scope of the technical solutions of various examples of the present disclosure; and therefore, it is intended that the appended claims include all such replacements and modifications within the scope of the disclosure.

The invention claimed is:

1. A stone-plastic floor, comprising a resin substrate, wherein an upper surface of the resin substrate is provided with a surface layer, and the resin substrate is prepared by following components in parts by mass:
   20-50 parts of a resin, 50-80 parts of calcium carbonate, and 4-5.6 parts of an auxiliary agent, wherein the resin substrate does not comprise toughening agent.

2. The stone-plastic floor according to claim 1, wherein the resin comprises one or more of PP resin, TPU resin and PVC resin; and
   the resin substrate has a thickness of 1-10 mm.

3. The stone-plastic floor according to claim 1, wherein the surface layer comprises a color film and a wear-resisting layer, wherein an upper surface of the resin substrate is provided with the color film, and an upper surface of the color film is provided with the wear-resisting layer;
   the upper surface of the color film is provided with a UV lacquer and the wear-resisting layer sequentially from bottom to top;
   the surface layer is provided thereon with an LVT layer, a fire-resistant layer or a veneer layer;
   the color film has a thickness of 0.06-0.08 mm; and
   the wear-resisting layer has a thickness of 0.07-1 mm.

4. The stone-plastic floor according to claim 1, wherein a lower surface of the resin substrate is provided with a bottom film; the bottom film has a thickness of 0.1-1.0 mm;
   a lower surface of the bottom film is provided with a muting layer; and
   the muting layer comprises one or more of a CORK muting layer, an EVA muting layer, and an IXPE muting layer.

5. The stone-plastic floor according to claim 1, wherein the auxiliary agent comprises one or more of a stabilizing agent, a modifying agent, a lubricating agent, and a coloring agent.

6. The stone-plastic floor according to claim 5, wherein the stabilizing agent is used in an amount of 1.5-2 parts.

7. The stone-plastic floor according to claim 5, wherein the modifying agent is used in an amount of 1.5-2 parts.

8. The stone-plastic floor according to claim 5, wherein the lubricating agent is used in an amount of 0.5-0.8 parts.

9. The stone-plastic floor according to claim 5, wherein the coloring agent is used in an amount of 0.5-0.8 parts.

10. A method for preparing the stone-plastic floor of claim 1, comprising heating, stirring and mixing raw materials uniformly in proportion, and then delivering resulting mixed materials to a mold for plastic molding and thermal insulation, attaching a surface layer onto a resulting profile after mold release and then performing thermal calendering attachment, to obtain the stone-plastic floor after cooling molding.

11. The method for preparing the stone-plastic floor according to claim 10, wherein the surface layer comprises a color film and a wear-resisting layer.

12. The method for preparing the stone-plastic floor according to claim 10, wherein the resulting mixed materials are extruded by a twin-screw extruder into a mold for plastic molding and thermal insulation.

13. The method for preparing the stone-plastic floor according to claim 12, wherein an extrusion temperature is 165-180° C.

14. The method for preparing the stone-plastic floor according to claim 12, wherein a thermal insulation temperature of the mold is 185-205° C.

15. The method for preparing the stone-plastic floor according to claim 12, wherein extrusion is performed by a co-extrusion die.

16. The method for preparing the stone-plastic floor according to claim 10, wherein the thermal calendering attachment is performed by using a four-roll calender or an oil hydraulic press;
- a temperature for the thermal calendering attachment is 125-160° C.;
- a pressure for the thermal calendering attachment is 6-18 MPa; and
- a time for the thermal calendering attachment is 30-90 min.

17. The method for preparing the stone-plastic floor according to claim 10, wherein a mixing temperature for heating, stirring and mixing the raw materials uniformly in proportion is 120-140° C.

18. The method for preparing the stone-plastic floor according to claim 10, wherein a stirring rate for heating, stirring and mixing the raw materials uniformly in proportion is 1500-2500 rpm.

19. The method for preparing the stone-plastic floor according to claim 10, wherein a stirring time for the heating, stirring and mixing the raw materials uniformly in proportion is 10-20 min.

* * * * *